(No Model.) 3 Sheets—Sheet 3.
R. W. RUTHERFORD.
COMBINED AGRICULTURAL IMPLEMENT
No. 284,982. Patented Sept. 11, 1883.
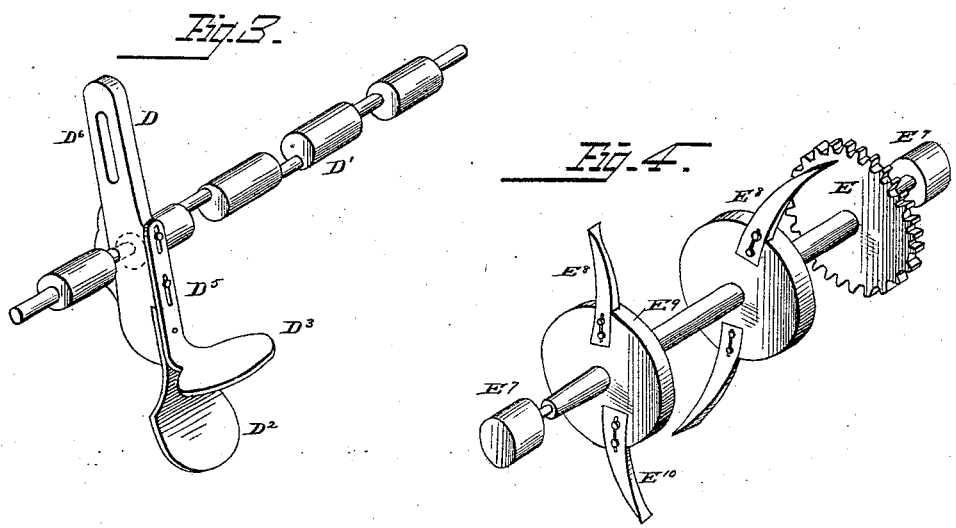
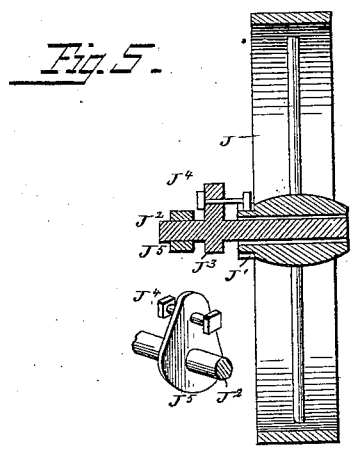
WITNESSES
F. L. Durand
Geo. H. Hildreth
INVENTOR
R. W. Rutherford
By F. A. Fouts
ATTORNEY

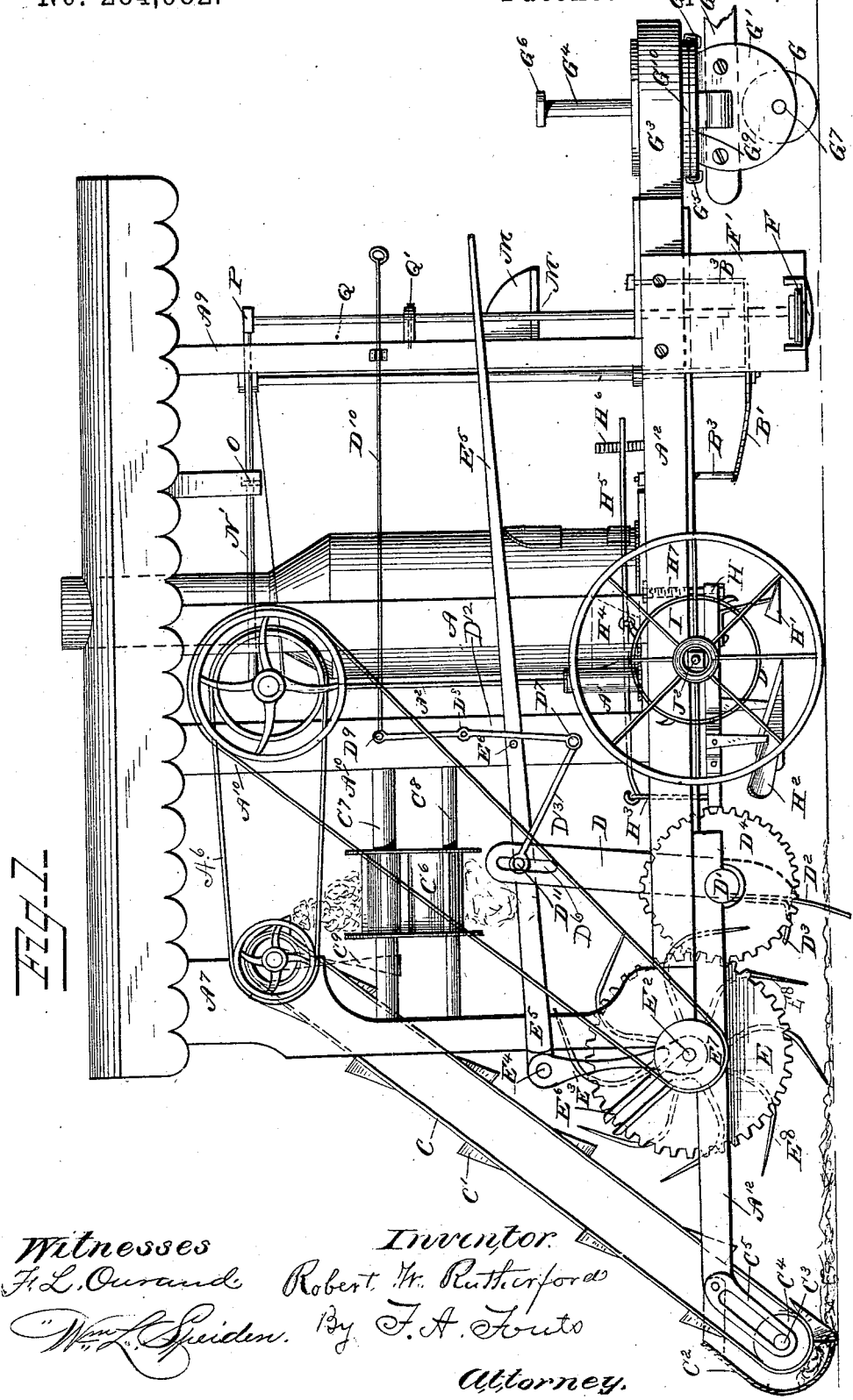

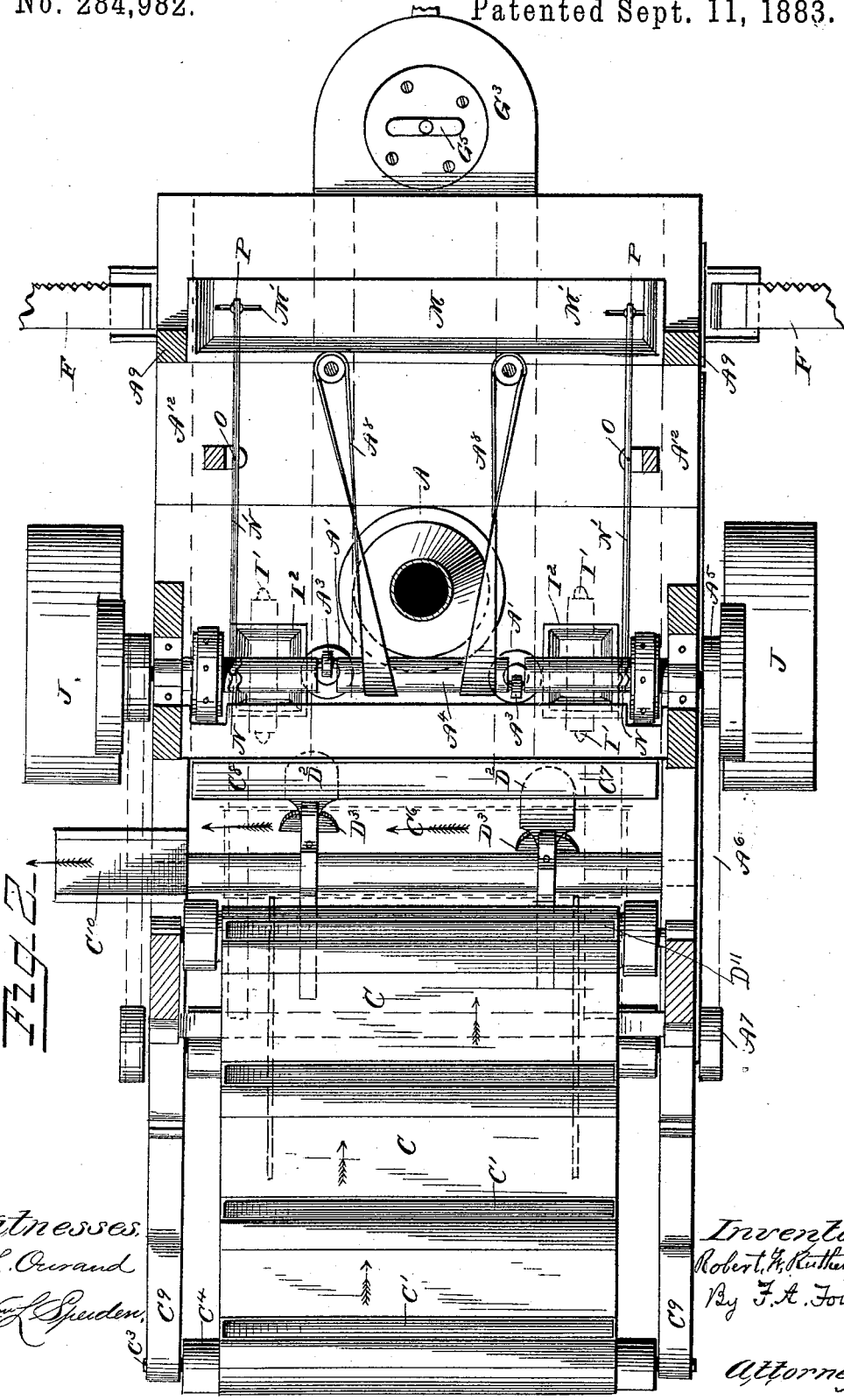

UNITED STATES PATENT OFFICE.

ROBERT W. RUTHERFORD, OF BRENHAM, ASSIGNOR TO ISAAC P. KIBBE, OF VICTORIA, TEXAS.

COMBINED AGRICULTURAL IMPLEMENT.

SPECIFICATION forming part of Letters Patent No. 284,982, dated September 11, 1883.

Application filed September 12, 1882. (No model.)

*To all whom it may concern:*

Be it known that I, ROBERT W. RUTHERFORD, a citizen of the United States, residing at Brenham, in the county of Washington, State of Texas, have invented certain new and useful Improvements in a Combined Agricultural Implement, of which the following is a specification, reference being had therein to the accompanying drawings.

My invention relates to a combined cultivator and ditcher mounted and operated upon the frame of a traction-engine; and it consists in the parts which will be hereinafter described, and pointed out in the claims.

In the accompanying drawings, Figure 1 represents a side elevation of a traction-engine provided on its rear end with the cultivator and ditcher attachments. Fig. 2 is a plan view of my improvements on a traction-engine. The handles of the hoe and spades are shown through the elevator-belt in dotted lines. The transverse belt leading to the side chute is also shown in dotted lines. The scraper attachment shown in Fig. 1 is omitted in this figure. Fig. 3 is a perspective view of the cranked roller provided with a hoe and spade. This roller is adapted to receive one or more spades and hoes. Fig. 4 represents disks fixed on the pulverizer-shaft, the outer edge of said disks being provided with adjustable teeth. Fig. 5 is a section of one of the traction-wheels, axle, arm, and key, showing the means by which the wheels are fixed in connection therewith, also a perspective view of a part of the axle, showing the arm, which is rigidly secured thereto, and the bolt or key adapted to engage the arm and nut and cause the wheel to revolve with the axle.

Similar letters refer to similar parts throughout the several views.

A represents the boiler, A′ the cylinders, and $A^2$ the rod leading from the cylinders to the main shaft.

$A^3$ is a crank, by means of which the main shaft $A^4$ is revolved.

$A^5$ is a drum on the main shaft, carrying belt $A^6$.

$A^7$ is a roller, around which belt $A^6$ passes, and by means of which the elevator-belt is operated. $A^9$ $A^{10}$ $A^{11}$ are standards on the main frame $A^{12}$.

C represents the carrying-belt or elevator, and C′ are the buckets thereon.

$C^2$ is a scraper carried on the under side of the bottom roller. The scraper raises the dirt, so that it may be taken up by the buckets.

$C^3$ are the spindles on the ends of roller $C^4$.

$C^5$ is a frame, having a longitudinal slot, in which the spindles $C^3$ rest. Frame $C^5$ is hinged to the rear end of the main frame. The combined weight of the roller $C^4$, scraper $C^2$, and buckets C′, loaded with dirt, will hold the scraper and lower end of the elevator down to the ground when it is desired to operate the ditcher.

$C^6$ is a transverse carrying-belt moved by rollers $C^7$ and $C^8$.

$C^9$ is a crossed belt communicating power from roller $A^7$ to roller $C^7$.

$C^{10}$ is a chute from which the dirt is discharged to the side of the machine.

D is a slotted arm, to which are adjustably attached the spades $D^2$ and hoes $D^3$.

D′ is a crank-shaft which actuates the hoes and spades.

$D^4$ is a gear-wheel fixed to shaft D′.

$D^5$ are vertical slots in the arm of hoe $D^3$. The hoe and spade arms are bolted together, so that by adjusting the hoe the spade is also adjusted. $D^{11}$ is the end of a rod running from one side of the frame to the other. It passes through the series of slots in the arms D.

$D^{13}$ is an arm fixed to rod $D^{11}$.

$D^7$ is a knuckle-joint connecting the forward end of arm $D^{13}$ to rod $D^{12}$.

$D^8$ is a pivot connecting the central part of rod $D^{12}$ to the standard $A^{10}$.

$D^9$ is a knuckle-joint connecting the rear end of rod $D^{10}$. By means of rod $D^{10}$ the hoe $D^3$ or spade $D^2$ may be caused to engage the ground or withdrawn therefrom at pleasure.

E is a gear-wheel mounted on roller $E^7$. Gear E engages gear $D^4$, and thereby communicates motion to the series of spades and hoes. The spades and hoes, being on a cranked shaft, are given a reciprocating motion.

$E^8$ are pulverizers or saw-teeth fixed on roller $E^7$. The pulverizer-teeth may be made in any number, and arranged to any width. $E^2$ are the spindles on said roller. $E^3$ is an arm jointed at $E^4$ to lever $E^5$. $E^6$ is a fulcrum for said lever on standard $A^{10}$. They are in the nature of teeth, and are provided with slots, whereby they are adjustable, by means of bolts, on disks $E^9$.

G is the forward guide-wheel, and $G'$ $G'$ vertical disks fixed to the tongue $G^2$.

$G^3$ is the forward end of the frame.

$G^4$ is the guide-standard. It is fixed to crown-plate $G^9$. Said plate is united on the tops of plates $G'$.

$G^6$ is a handle on the top standard, $G^4$.

$G^5$ are clamps fixed to the under plate, $G^{10}$. These clamps pass around under the crown-plate $G^9$, and serve to keep said plate in place. The plate moves freely in the clamps.

$G^7$ is the axle of wheel G, and it has its bearings in the sides of disks $G'$.

J are the side traction-wheels, and $J'$ the hub thereof. $J^2$ is the axle connecting said wheels. $J^3$ are arms rigidly fixed on said axle.

$J^4$ is a key having heads on each end. This bolt or key passes through an opening in arm $J^3$. A series of recesses are formed on the outer surface of the inner side of the hub, which are adapted to engage the key on the arm, when desired, whereby the wheels J may be fixed to the shaft and caused to revolve therewith. The key has a lateral adjustment.

$J^5$ is a shoulder on axle $J^2$.

L represents the cover or awning above the machine.

M is the seat on standard $A^9$.

Having thus described my invention and set forth its advantages, I claim as new and desire to secure by Letters Patent—

1. In a combined ditching and cultivating machine, the elevator and transverse carrying-belts, constructed as described, scraper $C^2$, journal $C^3$, and slotted arm $C^5$, in combination with the gear-wheels E and $D^4$, carrying the cultivating and pulverizing teeth and their operating mechanism, whereby the ground may be broken up, elevated, and discharged from the machine, thereby forming a ditch or levee.

2. The gear-wheel E, fixed on roller $E^7$, said roller being provided with journals $E^2$, working in slotted arm $E^6$, in combination with arm $E^3$, having knuckle-joint $E^4$, and lever $E^5$, pivoted at $E^6$ to standard $A^{10}$, the roller $E^7$ being provided with teeth $E^8$, substantially as described, and for the purposes set forth.

3. The gear-wheel $D^4$, cross-piece $D'$, provided with arm D, shovels $D^2$, and hoe $D^3$, the arm D having slot $D^6$, in combination with the arm $D^{13}$, lever $D^{12}$, and rod $D^{10}$, the parts being united and operated in the manner specified.

4. In a traction-engine mounted as specified, the traction-wheel J, having recesses $J'$, arm $J^3$, key $J^4$, and shoulder $J^5$, the shoulder and arm being rigidly fixed to the shaft, the key passing through an opening in the arm, and being provided on either end with bolt-heads, whereby it is held in the arm and adapted to lateral adjustment, so that the wheel and its axle may be connected and caused to revolve together, or the key disengaged from the hub and the wheel permitted to move freely on the hub, substantially as described, and for the purposes specified.

In testimony whereof I affix my signature, in presence of two witnesses, this 12th day of September, 1882.

ROBERT W. RUTHERFORD.

Witnesses:
 R. D. O. SMITH,
 E. R. McKEAN.